Jan. 9, 1934.    G. A. WOOD    1,942,737
GYROSCOPE CONTROL
Filed Sept. 3, 1929    2 Sheets-Sheet 2

Inventor
Garfield A. Wood
By Liverance and Van Antwerp
Attorneys

Patented Jan. 9, 1934

1,942,737

UNITED STATES PATENT OFFICE 1,942,737

GYROSCOPE CONTROL

Garfield A. Wood, Algonac, Mich.

Application September 3, 1929. Serial No. 390,153

6 Claims. (Cl. 74—78)

This invention relates to gyroscopes and more particularly to means for automatically maintaining the gyroscope plane of rotation relative to the earth.

An ordinary gyroscope has a tendency to rotate in a fixed plane but this plane has no relation to the earth. Gravity has apparently no effect upon gyroscopic action and therefor, when the gyroscope is set to rotate in a certain plane, this plane will remain the same relative to the universe but without relation to the earth and the rotation of the earth on its axis constantly changes the relation of the gyroscopic plane to the earth. Furthermore, if the gyroscope is moved from place to place on the earth's surface, its plane will not automatically alter with such movement and therefore will be at variance with the earth's surface at different locations thereon. Also, although the tendency of the gyroscope is to remain in a fixed plane, it is practically impossible for it to do so because it is subject to exterior forces which will alter its plane of rotation such as slight deficiencies in balance, wind pressures and frictional resistance in its mounting device and therefore a gyroscope must be adjusted from time to time to correct the effects of these outside forces, when it is to be used in a fixed plane in relation to the earth's surface such as for an artificial horizon.

The device embodying this invention is particularly intended to be utilized in guiding an airplane and, as the airplane flies and must be guided with relation to the earth's surface, it becomes necessary, in utilizing a gyroscope for airplane guidance, to maintain the gyroscope with a fixed relation to the earth.

The specific mechanism embodying this invention, whereby the desired results are obtained, is hereinafter more fully described and particularly pointed out in the claims, reference being had to the accompanying drawings, in which, Fig. 1 is a side elevation of the device with its supporting ring broken away.

Like numbers refer to like parts in the different figures of the drawings.

Figure 1:
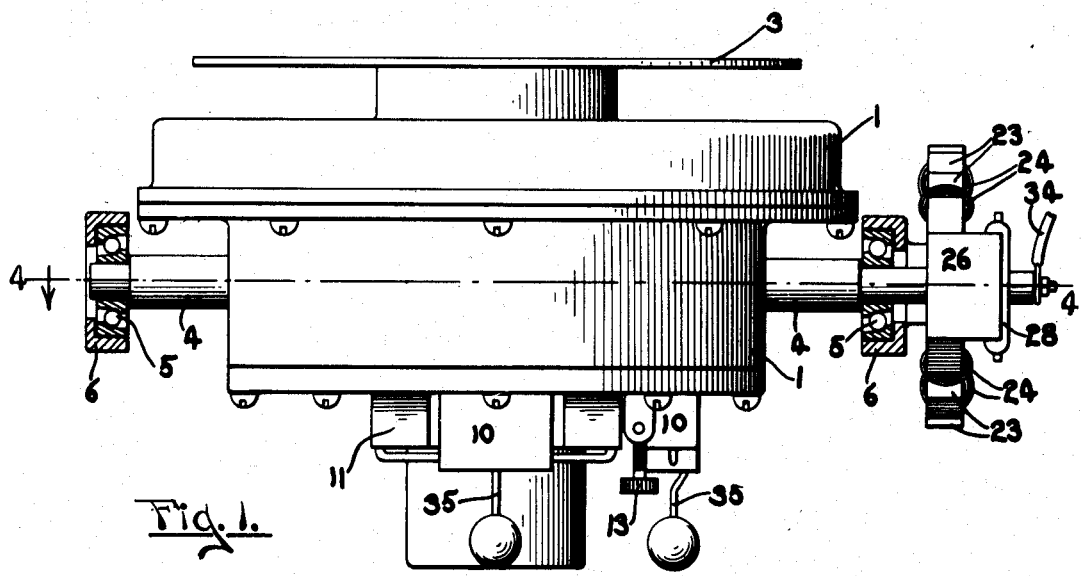
Figure 2:
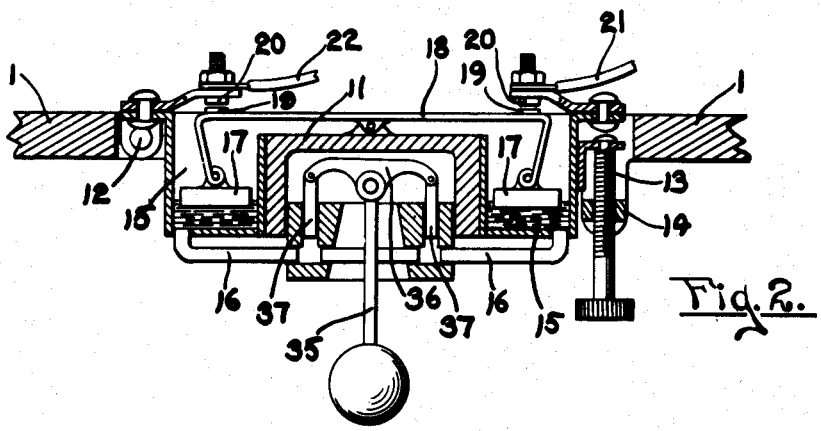
Fig. 2 is an enlarged sectional elevation of one of the leveling devices.
Figure 3:
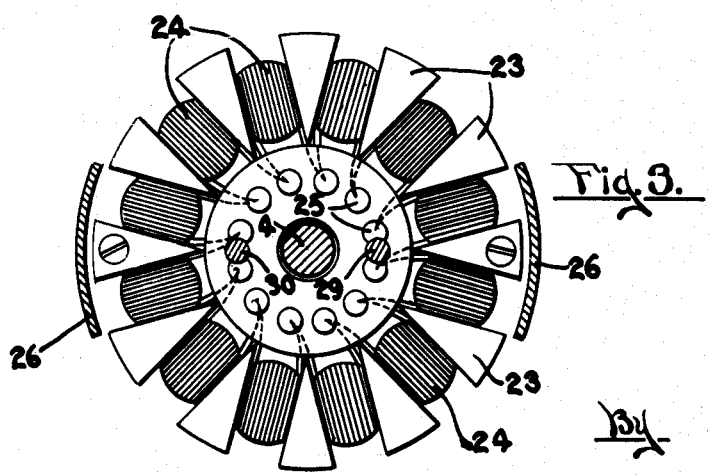
Fig. 3 is a sectional end view on the line 3—3 of Fig. 4.
Figure 4:
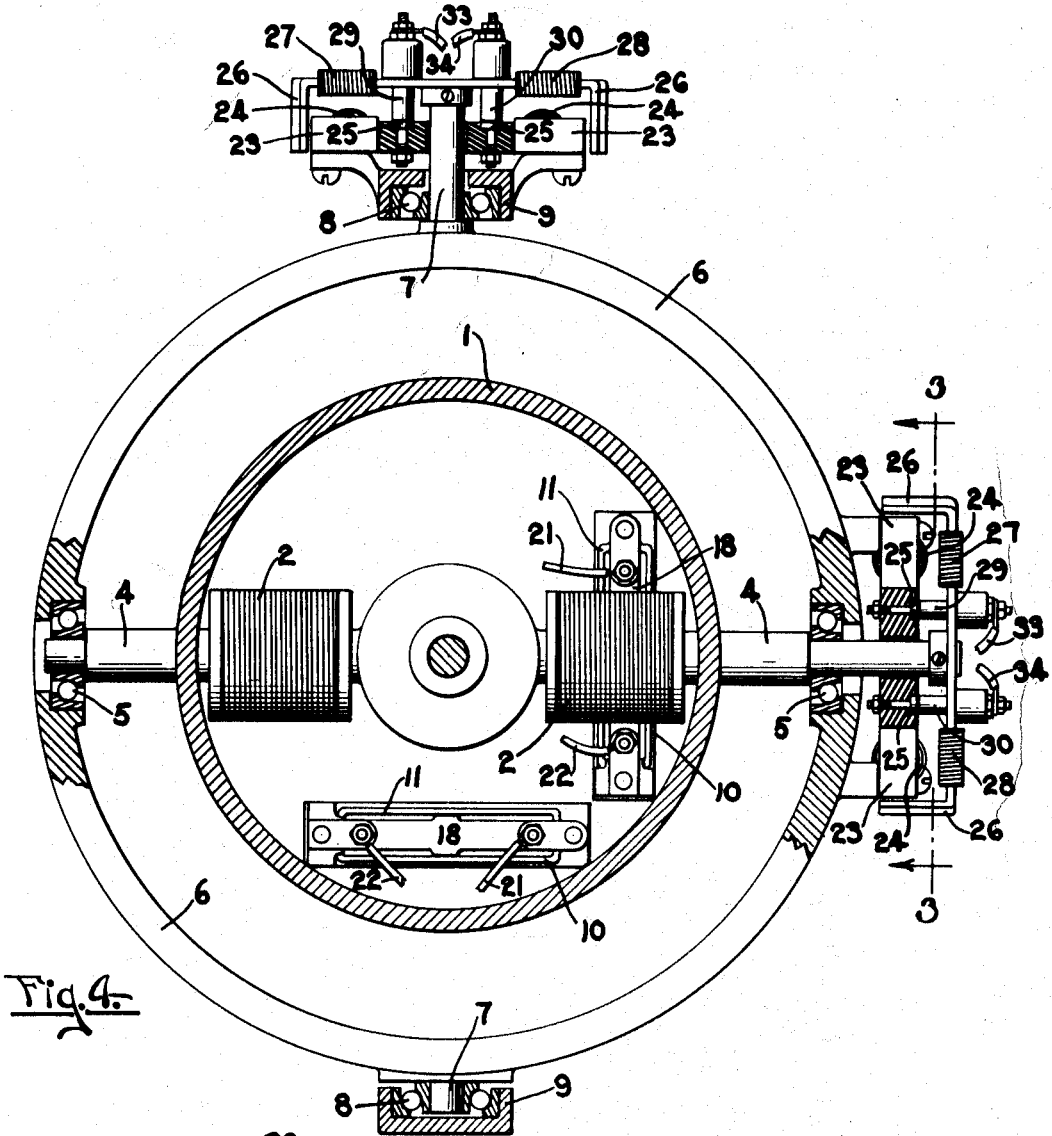
Fig. 4 is a sectional plan view on the line 4—4 of Fig. 1.

The gyroscope of this invention is of conventional type consisting of a disk, gyrostat, or rotor mounted for rapid rotation and provided with a suitable motor to rotate it at a high speed. These parts are conventional and well-known and are not shown in the drawings but are enclosed within the housing 1. The coils 2, also located within the housing 1, are the field coils of the electric motor used to rotate the gyroscope disk and form no part of the specific invention. The present embodiment of this invention is used as a sighting device for which purpose a plate 3, preferably in the form of a disk, is attached to the housing 1 and preferably in a plane parallel to the gyroscope disk within the housing and this plate serves the pilot as an artificial horizon by means of which he can judge his flight.

The housing 1 is provided with the conventional gimbal mounting which comprises the housing trunnions 4 extending laterally from opposite sides of the housing and carried in ball bearings 5 on a gimbal ring 6 and the gimbal ring has trunnions 7 extending laterally therefrom at right angles to the trunnions 4 and mounted in ball bearings 8 supported in standards 9, which standards are of suitable form to be mounted in an airplane to support the weight of the device. The standards may be mounted for vertical adjustment to raise or lower the device to the proper height.

Before proceeding further with an explanation of the mechanism it is to be understood that the position of the gyroscope may be altered by exterior forces or pressures against any of its parts such as the housing or the members on which the housing is carried. The amount of force required to alter the position of the gyroscope depends upon the size and weight of the gyroscope rotor and also upon its speed of rotation but for a gyroscope of ordinary proportions comparatively little force is required to change its position. A peculiar characteristics of gyroscope is that its reaction to a force applied for correction purposes does not occur at the point where the force is applied but at a point 90 degrees therefrom. Hence a force to change the plane of the gyroscope must be applied to a point 90 degrees removed therefrom in its plane of rotation. This fact will account for the location of certain of the parts in the mechanism hereafter described.

Two leveling devices 10 are mounted on the housing 1 in substantially the same plane as the gyroscope disk and at right angles to each other, each extending at right angles to the axis of a pair of trunnions 4 and 7. Each leveling device comprises a body member 11 which is preferably pivotally attached at one end to the housing 1 on the pivot 12 and is provided at its other end with an adjusting screw 13 having one end attached to the body 11 and being threaded through a member 14 connected to the housing 1 whereby the position of the leveling device may be varied relative to the gyroscope.

The body is provided at opposite ends with pockets 15 which are joined by a passage 16 communicating with the bottom of each pocket and a fluid is contained in the pockets and passage and is normally free to flow back and forth from one pocket to the other. Floats 17 are located in the pockets and float upon the fluid therein and for efficiency in operation it is desired to use mercury as the fluid as it is very heavy and hence easily affected by gravity and the floats 17 may be of solid aluminum which has a greatly less specific gravity than mercury and hence lightly floats upon the top thereof.

The floats 17 are attached to opposite ends of a rocking contact bar 18 pivoted at its center to the body 11 and provided near its opposite ends with electric contact points 19. Over each contact point 19 on the contact bar are located fixed electric contacts 20. Conductor wires 21 and 22 lead from the fixed contacts 20 and the contact bar 18 serves as a conductor for the contacts 19 and is itself in electric circuit, preferably by conductive mounting on the device whereby it is grounded.

One of each of the trunnions 4 and 7 is provided with power means in the form of an electric motor whereby the position of the gyroscope may be regulated, the motor on the trunnion 4 acting directly to rotate the gyroscope on the axis of the trunnions 4 and the motor on the trunnion 7 acting through the gimbal ring 6 to rotate the gyroscope on an axis at right angles to the trunnions 4.

The motors each comprise an armature 23 having windings 24 and commutator segments 25 of conventional motor type and a field magnet having pole pieces 26 oppositely located adjacent the periphery of the armature. The field magnet is provided with two reversely wound coils 27 and 28, only one of which is utilized at a time and commutator brushes 29 and 30 are mounted in the body of the field magnet and contact the commutator segments 25. These features, although of somewhat original design in the present invention, are of ordinary electric motor principle and the electric circuit utilized is also conventional, having the field winding in series with the commutator windings.

In the motor for the trunnion 4 the armature 23 is fixed to the gimbal ring 6 and the trunnion 4 extends through the commutator and has the field magnet fixed to its outer end. The motor for the trunnion 7 has its armature fixed to the standard 9 and the trunnion 7 extending through it has the field magnet fixed to its outer end. Therefore, when either of the motors is in operation it has a tendency to rotate its respective trunnion shaft 4 or 7 in one direction or the other relative to its armature, the direction of rotation being governed by the utilization of one or the other of the reversely wound field coils 27 and 28, this being the method of reversing the motor rotation.

Figure 5:
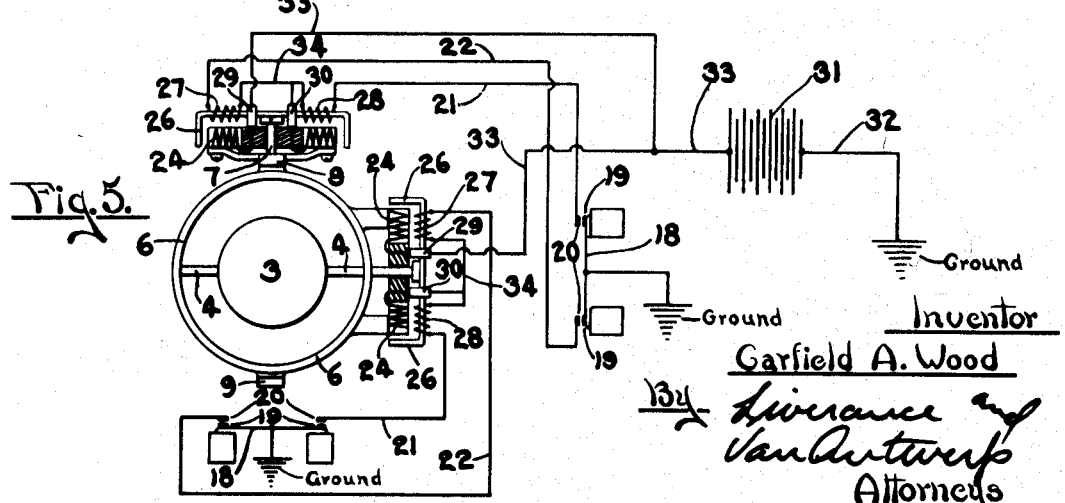
Fig. 5 is a diagram of the wiring arrangement of the device.

Referring to the wiring diagram, Fig. 5, 31 represents the source of electrical energy having one pole 32 grounded. A conductor 33 extends from one pole and branches to lead to the brush 29 of each motor. The brush 29 in contact with a commutator segment 25 conducts the current to the armature windings 24 through which it flows to the brush 30 from which a conductor 34 branches and leads to the respective field coils 27 and 28 and from these field coils 27 and 28 the current is led by the conductors 21 and 22 to the opposite fixed contact points 20 of a leveling device, each motor coacting with one of the leveling devices for actuation.

To complete the circuit the current will flow through one or the other of the contacts 20 when engaged by one of the contacts 19 and thence through the bar 18 to the ground and when neither of the contacts 19 is engaged with a contact 20 the circuits are broken and the motor does not operate.

By means of the foregoing mechanism the gyroscope is maintained in fixed relation to the earth because of the fact that the fluid in the leveling devices is affected by gravity and, by actuating the floats 17 it moves them in one direction or the other to correct the position of the gyroscope.

Because of the aforementioned peculiar character of the gyroscope requiring pressure to be exerted at 90° from the point of movement, each leveling device is located at 90° from the motor with which it coacts. In operation, if the gyroscope becomes out of level either or both of the leveling devices will immediately detect the fact by means of the flow of mercury from one pocket 15 to the other thereof and will raise the float 17 in one of the pockets and lower it in the other thereby rocking the bar 18 and engaging one of the contacts 19 with its respective contact 20 and closing the electric circuit. This closing of the electric circuit immediately energizes the motor and directs its torque in a direction according to the field coil 27 or 28 through which the current flows through either the conductor 21 or 22 and when the motor is so energized it immediately corrects the position of the gyroscope and returns it to level whereat the mercury in the leveling device again equalizes in the pockets 15 and the floats 17 return the contact bar 18 to normal position, braking the circuit and causing the motor to become inactive in which condition it will remain until the gyroscope again becomes out of level and requires correcting.

It is desired that only the force of gravity actuate the leveling devices and that centrifugal force have no effect upon them. If an airplane should fly in a curve the centrifugal force developed thereby would tend to flow the mercury from one pocket 15 to the other, overcoming the force of gravity to retain it level and to prevent this a weighted arm 35 is pivotally hung upon the leveling device and has a cross arm 36 to the opposite ends of which are connected valves 37 which move to close the passage 16 from one pocket 15 to the other. When the device is affected by gravity only the weighted arm 35 will hang straight down in which position the valves 37 are clear of the passage 16 and do not affect it but upon action of centrifugal force the weighted arm 35 will swing on its pivot and move one or the other of the valves 37 into the passage 16 and close it and thus prevent the flow of mercury through the passage from one pocket 15 to the other by action of the centrifugal force. Upon cessation of the centrifugal force the arm 35 will return to its normal depending position and also return the valves 37 to their normal positions opening the passage 16 so that the flow of mercury may be effected by gravity.

The adjustment of the leveling devices on their pivots 12 by means of the adjusting screws 13 is for the purpose of adjusting the apparatus relative to the airplane in which it is mounted and these adjusters may be used to cause the disk 3 to assume and maintain a position other than horizontal, if desired, and this position may be adjusted longitudinally or transversely of the airplane, as desired, because of the relative positions of the two leveling devices at right angles to each other.

Although a specific form of electric motor for correcting the gyroscope position has been shown and described it is to be understood that this particular type is not essential. A device of this nature is desirable because it will permit a complete rotation of the airplane which supports the gyroscope on either of its axes such as in looping or in rolling and these movements may be accomplished with no effect upon the action of the controlling motor as any part of the commutators thereof is equally affected by the field magnets and the gyroscope is permitted to maintain its fixed plane throughout and is unaffected by any movement of the airplane on which it is mounted. It is to be further understood that electrical means are not essential to the accomplishment of the result but such means has been conceived as best adaptable therefor. Likewise the electric motor means for rotating the gyroscope disk is not essential and may be replaced by other driving mediums which may be found suitable.

This device mounted in an airplane will always remain in its predetermined position relative to the earth and by means of observing the plate 3 thereon the aviator may maintain the equilibrium of the airplane when he is unable to see anything upon the earth from which to judge his levels. For example, if the disk 3 was level when adjusted at the height of a pilot's eye, he would see a straight line, and assume the airplane was in perfect flight under these conditions. Should the disk show the top side or oval, the plane would be headed down, whereas if the bottom side of the disk shows oval, the plane would be in a climb position. Also, if the disk appeared tilted to one side of the other, it would indicate that the plane was flying with one wing down.

Having thus disclosed my invention, I claim as new and desire to secure the following combinations and elements, or equivalents thereof, by Letters Patent of the United States.

I claim:

1. The combination with a gyroscope mounted for pivotal movement, of an electric motor arranged to turn the gyroscope in either direction on its pivot and a gravity actuated controlling device movable with the gyroscope comprising a float chamber containing fluid, a rocker arm pivoted between its ends and having a float at each end in said fluid, an electric circuit breaker near each end of said rocker arm whereby movement of the rocker arm in either direction will open or close circuits in the circuit breakers, and electric conductors combined with a source of electrical energy connected with said circuit breakers and said motor to rotate the motor in either of opposite directions when the circuit is closed at either of the circuit breakers.

2. The elements and combination defined in claim 1, and means associated with said gravity actuated controlling device to prevent the action of centrifugal force thereon.

3. A gravity actuated electric circuit controlling device comprising a float chamber containing fluid, a rocker arm pivoted between its ends and having a float at each respective end in said fluid, an electric circuit breaker near each end of said rocker arm adapted by movement of said rocker arm to open or close the electric circuit and means to prevent the action of centrifugal force from actuating said rocker arm.

4. A gravity actuated electric controlling device comprising two float chambers containing fluid, a passage communicating with both of said chambers, a rocker arm pivoted between its ends and having a float at each end in the fluid in each of said chambers, an electric circuit breaker near each end of said rocker arm actuated by movement of said rocker arm to open or close an electric circuit, a valve in said passage, and means actuated by centrifugal force to close the valve, said means acting to open the valve in the absence of centrifugal force.

5. The combination with a gyroscope mounted for pivotal movement, of an electric motor associated therewith for rotating the gyroscope in either direction upon its pivot, a gravity actuated controlling device movable with the gyroscope comprising two spaced apart chambers containing fluid, a conduit extending between said chambers and normally permitting the flow of fluid between them, a valve in said passage, means connected with said valve and acted upon by centrifugal force to close the same, said means acting to open the valve in the absence of centrifugal force, a rocker arm pivoted between its ends and having a float at each respective end in each of said chambers, an electric circuit breaker near each end of said arm and actuated by movement of said arm to open or close an electric circuit and electrical conductors combined with a source of electric energy connected with said circuit breakers and said motor whereby the motor is rotated in either of two opposite directions when the circuit is closed by either of said circuit breakers.

6. A gravity actuated electric circuit controlling device comprising, a float chamber containing fluid, a movable arm, a float attached thereto and resting in said fluid, an electric circuit breaker on the movable arm adapted to be opened and closed by movement of same and means to prevent the action of centrifugal force from actuating said movable arm.

GARFIELD A. WOOD.